(12) United States Patent
Hastings et al.

(10) Patent No.: US 7,808,501 B2
(45) Date of Patent: Oct. 5, 2010

(54) METHOD OF SHADING USING SAMPLE VECTORS

(75) Inventors: Allen Hastings, Los Altos Hills, CA (US); Stuart Harl Ferguson, Sunnyvale, CA (US); Greg Duquesne, Bordeaux (FR)

(73) Assignee: Luxology, LLC, Mountain View, CA (US)

( * ) Notice: Subject to any disclaimer, the term of this patent is extended or adjusted under 35 U.S.C. 154(b) by 749 days.

(21) Appl. No.: 11/485,866

(22) Filed: Jul. 13, 2006

(65) Prior Publication Data

US 2007/0024619 A1    Feb. 1, 2007

Related U.S. Application Data

(60) Provisional application No. 60/704,695, filed on Aug. 1, 2005.

(51) Int. Cl.
*G06T 15/50*    (2006.01)
*G09G 5/00*    (2006.01)
*G09G 5/02*    (2006.01)

(52) U.S. Cl. .................. 345/426; 345/581; 345/589

(58) Field of Classification Search ................ 345/426, 345/581, 589
See application file for complete search history.

(56) References Cited

U.S. PATENT DOCUMENTS

| | | | |
|---|---|---|---|
| 4,885,703 A * | 12/1989 | Deering | 345/422 |
| 5,966,134 A * | 10/1999 | Arias | 345/589 |
| 6,496,190 B1 * | 12/2002 | Driemeyer et al. | 345/619 |
| 6,538,651 B1 * | 3/2003 | Hayman et al. | 345/419 |
| 6,717,576 B1 * | 4/2004 | Duluk et al. | 345/419 |
| 6,771,264 B1 | 8/2004 | Duluk et al. | |
| 7,176,917 B1 * | 2/2007 | Morgan et al. | 345/426 |
| 2002/0154116 A1 | 10/2002 | Nakatsuka et al. | |
| 2003/0222870 A1 | 12/2003 | Driemeyer et al. | |
| 2006/0098017 A1 * | 5/2006 | Tarditi et al. | 345/505 |
| 2006/0274070 A1 * | 12/2006 | Herman et al. | 345/474 |
| 2007/0018980 A1 * | 1/2007 | Berteig et al. | 345/426 |

OTHER PUBLICATIONS

PCT International Search Report, Jul. 2, 2007.

* cited by examiner

*Primary Examiner*—Xiao M Wu
*Assistant Examiner*—David T Welch
(74) *Attorney, Agent, or Firm*—Gordon & Rees LLP

(57) ABSTRACT

A method of shading, by: storing shading information in a sample vector comprising a plurality of packets, wherein each packet represents a shading property; performing a series of sequential actions on the sample vector, wherein each of the sequential actions operates on at least one, but less than all of the plurality of packets in the sample vector, such that the sample vector is updated by each sequential action; and then performing a lighting computation on the updated sample vector, wherein the lighting computation operates on all of the plurality of packets in the sample vector, thereby calculating a final sample vector to be rendered for the sample vector.

10 Claims, 3 Drawing Sheets

METHOD OF SHADING USING SAMPLE VECTORS

RELATED APPLICATION

The present application claims priority under 35 U.S.C. Section 119 to U.S. Provisional patent application 60/704, 695, entitled "Animation Software", filed Aug. 1, 2005.

TECHNICAL FIELD

The present invention relates to computer animation software.

BACKGROUND OF THE INVENTION

A critical part of rendering images is computing the shading of samples. Typically, shading is done in one of two ways, either by using a "shading language" or a "shading network".

A shading language (such as Renderman™) is a form of scripting or a programming language that is specifically designed to compute shading. The inputs from each sample are fixed based on the geometry type, and all the texturing, lighting and other effects are integrated into a comprehensive shading program. In such systems, different shaders are used for different types of outputs. For example, different shaders may be provided for displacement and for final color. Unfortunately, these sort of shading languages can be hard to use, especially for non-technical artists.

A shading network is a system that presents a more graphical user interface for constructing shaders. A "DAG" (directed acyclic graph), also known as a "node system", is used to represent a shading network. In these systems, the final node is usually a lighting model, and all the different nodes that output to that node can come from nodes that output compatible value types, like scalars or colors. The geometric parameters from the sample are the inputs to the network. Unfortunately, shading node networks can be complex to specify and to modify.

Another problem with these existing systems is that they are limited in terms of the inputs available. For example, shading typically involves setting values based on input parameters such as position and UV from surfaces. In addition, existing shading systems operate differently for different output types. As a result, existing shading systems typically employ different shaders for different processes to process surfaces for rendering. For example, displacement typically happens before scan-conversion so the displacement shader is typically evaluated first with a subset of the inputs that a final-color shader would have. Therefore, any shared components between these two shaders would have to be managed by the user. Again, this results in excessive complexity for the user.

SUMMARY OF THE INVENTION

The present invention provides a method of shading, comprising: storing shading information in a sample vector comprising a plurality of packets, wherein each packet represents a shading property; performing a series of sequential actions on the sample vector, wherein each of the sequential actions operates on at least one, but less than all of the plurality of packets in the sample vector, such that the sample vector is updated by each sequential action; and then reading out shading results from modified or unmodified packets in a final sample vector.

In optional aspects, this may involve performing a lighting computation on the updated sample vector, wherein the lighting computation operates on all of the plurality of packets in the sample vector, thereby calculating a final sample vector to be rendered for the sample vector. This may involve reading material properties from the sample vector packets and writing final color and alpha values to one or more of the output packets.

As a result, the present invention provides a single shader for performing all aspects of rendering of a single surface or element.

As will be shown, the present method of shading conserves computer resources by using sample vectors that store shading information in discrete packets. These packets can be accessed at different times by different processes. Specifically, a first process may access some of the packets and either read from, or read from and write to, or just write to, these packets. A second process may access different (or the same) packets and either read from, or read from and write to, or just write to, these packets. An advantage of the present system's approach is that it is not necessary for all of the shading data to be processed at every step in the shading process. Nor is it necessary to use a plurality of different shaders. Rather, by storing shading property data in easily accessible packets, only those packets that need to be read from (or written to) are accessed by different processes.

In other aspects of the invention, a method of shader slicing is provided. This method may comprise the steps of: selecting a master shader which operates on sample vectors, wherein the sample vectors each comprise a plurality of packets, wherein each packet represents a shading property; selecting a desired set of output packets; creating a sliced shader from the master shader to compute only the desired set of output packets; and reading a required set of input packets to compute the desired set of output packets.

As a result, the present invention provides a system in which shading operations can be "layered" (i.e.: performed sequentially) or "sliced" (performed separately) without requiring a single shader to have operate on all of the shading data all at once.

In one exemplary embodiment of the present invention, a sample vector is stored with packets of shading information. Next, a base material calculation is performed on sample vector, thereby outputting a set of packets defining basic surface attributes of the sample vector. Next, a general shader calculation is performed on the sample vector, thereby outputting a set of packets defining general shading characteristics of the sample vector. Next, an effect calculation may be performed on the sample vector, thereby outputting a set of packets defining an effect on the sample vector. In addition, a texture calculation may be performed on the effect calculation, thereby outputting a set of packets defining a texture for the effect.

Performing each of these steps updates the data in the packets in the sample vector. However, in accordance with the present invention, each of the base material calculation, general shader, effect and texture operations may read from and write to different (or the same) sample packets. As will be shown, each step in the overall shading process only accesses those data packets that it requires. This significantly reduces the computer resources required.

The above example details operations that were performed sequentially (i.e. "layered"). It is to be understood that the above processes is merely exemplary. Thus, the present invention is not so limited. Rather, in accordance with the present invention, different numbers of alternate operations or processes can be performed, and in different orders. The unique advantage of the present invention, however, is that only those packets of shading data that are needed to be accessed by these separate operations or processes are in fact accessed by these separate operations or processes (and at the times they are needed).

In optional aspects of the invention, the sequential actions performed on the sample vector may comprise actions that copy at least one packet from a main stack to a sub stack. As such, intermediate results can be saved or communicated between various operations such as between texture layers of a sub-branch texture computation. Thus, the present sample vector can be used as a "blackboard" for computing intermediate results during shading. In another optional aspect of the invention, the sequential actions performed may comprise actions that store packet pointers as nodes. This is advantageous in that instead of computing texture layers directly, the texture layers can instead specify the computations that they will perform later.

DETAILED DESCRIPTION OF THE DRAWINGS

The present invention provides a method of shading by storing and operating on material attributes and shading information in packets in sample vectors. As will be shown, a variety of different sequential actions access different packets in the sample vector such that the full shading computation can be "layered". Such layered shaders can also be "sliced" to optimize for a selected subset of output packets.

Figure 1:
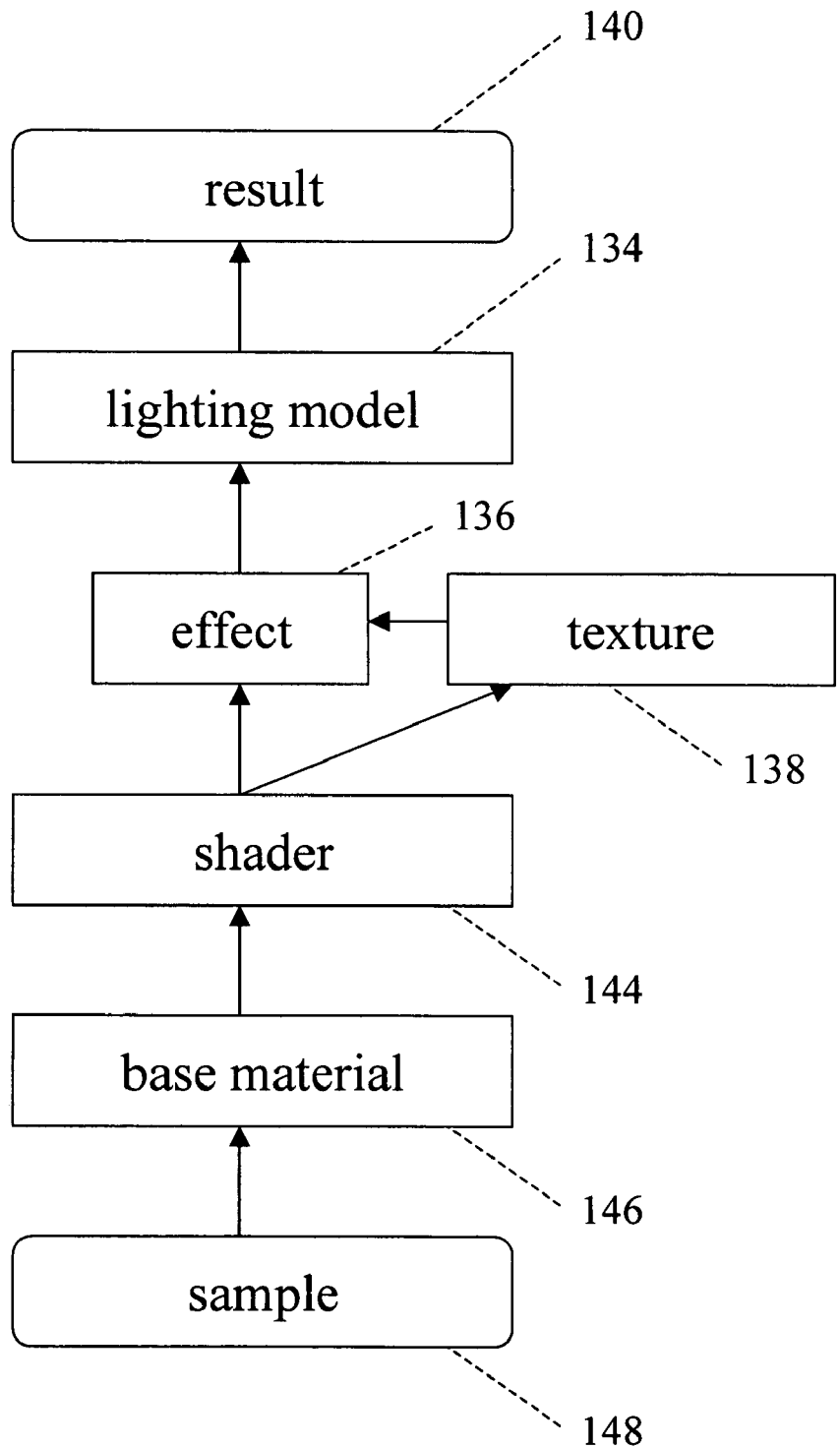
FIG. 1 is an illustration of a layered shading operation.

FIG. 1 is an illustration of a shading process that is carried out in layers, as follows: A sample vector 148 is provided. As will be explained more fully below (with respect to FIGS. 2 and 3), sample vector 148 comprises a string of packets. Each packet comprises data relating to a particular shading property. For example, such shading information may include, but is not limited to, data representing position, normal, texture, material, UV coordinate, or UV gradient from a sample to be shaded. The information initially stored in sample vector 148 typically comprise data that has originally been supplied from a render engine such as 3D surface sample information obtained from scan conversion or ray tracing. Such data may optionally be derived from a UV scan conversion from texture baking, or 3D volumetric sampling, or many other possible sources.

A series of sequential actions are performed on sample vector 148. Each of these sequential actions either reads from, reads from and writes to, or just writes to, specific packets in the sample vector. Thus, the information stored in the various packets in the sample vector is updated by each sequential action performed on the sample vector.

For example, in FIG. 1 a base material calculation 146 first operate on the sample vector 148. This action reads no input packets and simply outputs a set of packets defining basic material attributes to the sample vector. The updated sample vector then moves to the next layer, being a general shader 144. General shader 144 then reads input packets from the sample vector 148, performs a general shading computation, and outputs a set of packets resulting from the general shading computation to the sample vector. In the next layer of the process, a simple texture calculation 138 is applied using effect 136. Simple texture calculation 138 may read input packets from the sample vector and compute a value such as a scalar or vector which is then output to effect 136. The effect reads a value (scalar or vector depending on the type of effect) from a specific packet or packets in the sample vector. The effect then mixes the output of the simple texture with the current value of the effect read from the sample vector, optionally using a blend operation and opacity. Thereafter, the merged result can be written back to the same packets that were read in the sample vector. In optional aspects of the invention, texture calculation 138 may include, but is not limited to, calculations involving calculating fractal noise, image maps or gradients.

Those packets in the sample vector that are not written to by effect 136 simply proceed unchanged directly to lighting model 134. In the final layer of the process, a lighting computation 134 is performed on the updated sample vector. Lighting computation 134 preferably reads sample packets in the (now fully updated) sample vector for material attributes and sample position and orientation, and then produces a final color or appearance that can be written back to the sample vector to packets containing color and alpha. The final shading result can be read out of the final configuration of the sample vector 140 after all stages of processing are complete.

As described herein, effects read some set of packets from the sample vector, and then output a value of a specific type (scalar, color, etc.). For example, an "intensity" effect would be an example of a read-only operation in which RGBA values are read from a sample vector packet, and a scalar output based on the luminance of the RGBA color value is provided. Such output values can be used as inputs to many different generalized texture layers, such as gradients, which compute new values based on the values of the inputs.

A read-only effect can compute a value based on reading packet values. A read-write effect can compute a value based on reading packet values, and can also write a modified value back to the same packets. For example, the above "intensity" effect could become read-write by allowing a new intensity to affect the RGBA color in the sample packet. This could allow textures to affect any attribute in the sample vector. Read-write effects are used when evaluating simple textures.

Another advantage of present invention is that many simple textures can be layered, with each assigned a specific effect (reading from and writing to the sample vector with methods associated with the particular effect). Thus, different texture layers may read a value, blend it with the result of another texture, and then write the composite. Alternately, they may just write without reading. Gradient textures, if any, could be used to perform transformations or remapping of inputs based on read-only effects. So they could read a scalar value (or vector) from the sample vector with a read-only effect, perform a transformation, and then output a computed value using some different read-write effect.

This entire process is naturally recursive. The entire shading process illustrated in FIG. 1 is itself a general shader, akin to general shader 144. Evaluating a series of sequential operations as a shader is done as follows. First one or more packets are copied from the main sample vector to a secondary sample vector. Then the set of sequential actions are applied to the secondary sample vector as described herein. In optional embodiments, some of the resulting packets in the secondary sample vector may be merged back into the main sample vector before the secondary sample vector is destroyed. This recursion can of course be carried out to arbitrary depth. As result, shaders may be nested and used as sub-shaders in multiple parts of the process for many useful purposes.

Figure 2:
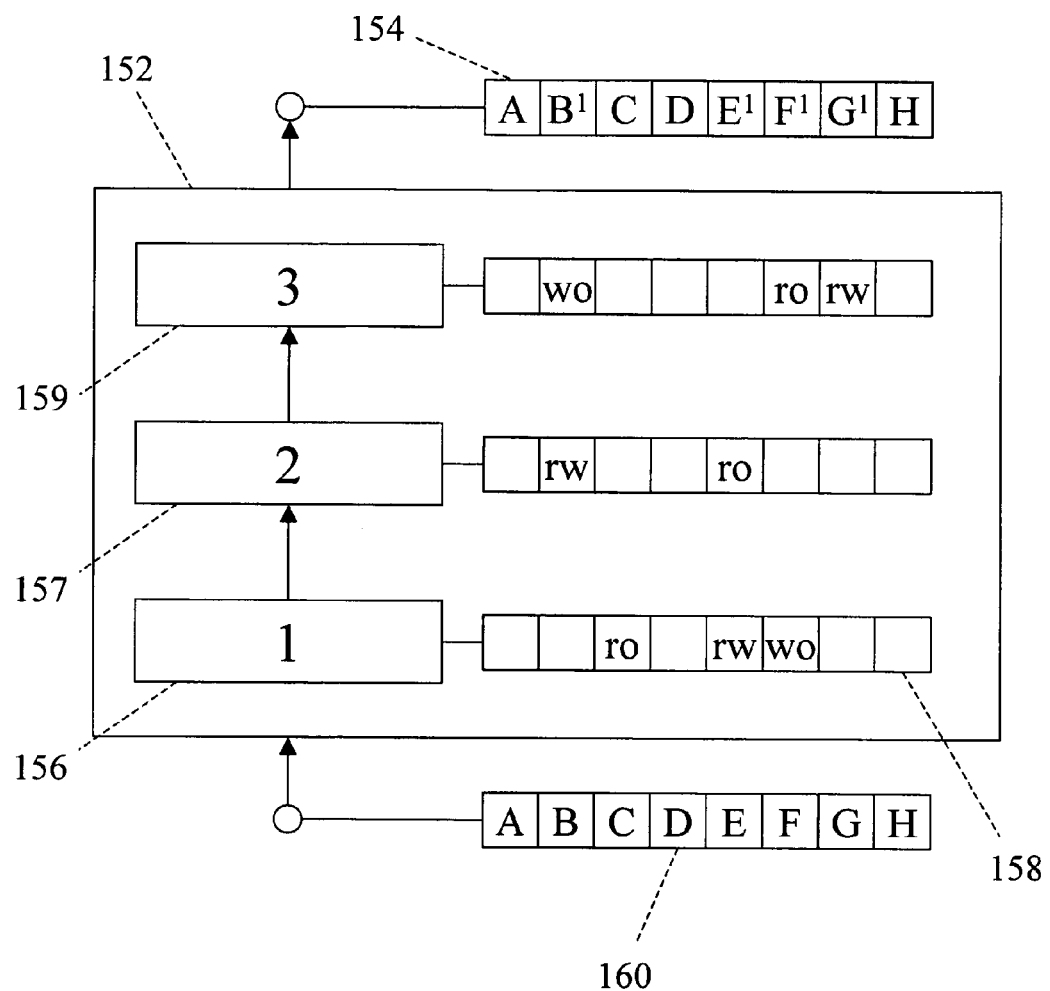
FIG. 2 is an illustration of a layered shader comprising three different shading processes, wherein the different shading processes access different sample packets in a sample vector.
Figure 3:
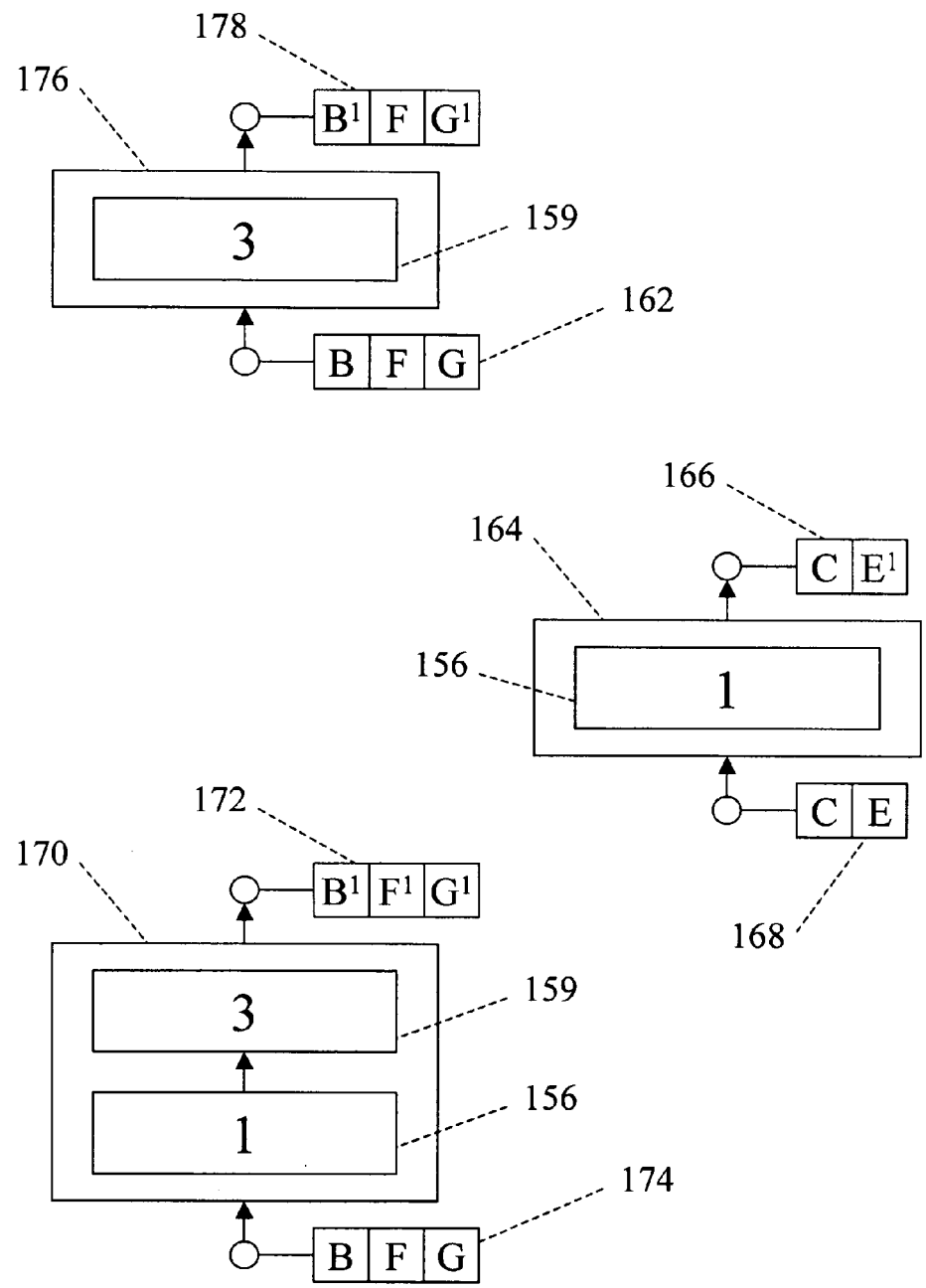
FIG. 3 is an illustration of a sliced shader comprising three separate shading processes.

FIGS. 2 and 3 show the process of "slicing" a layered shader. Specifically, FIG. 2 is an illustration of a layered shader comprising three different sequential operations, wherein the different operations access different sample packets in a sample vector; and FIG. 3 is an illustration of three different "slices" of the layered shader, as follows.

FIG. 2 illustrates a master shader 152 comprising a series of shading operations or processes that each read from, or read from and write to, or just write to, packets in sample vector 160. Sample vector 160 comprises sample packets A to H. As will be shown, successive processes operate on some of each of these sample packets A to H. For example, when master shader 152 is applied, its first shading process 156 has a vector type 158 in which packet C is read-only (labeled "ro"), packet E is read/write (labeled "rw"), and packet F is write only (labeled "wo"). Thus, first process 156 takes sample vector 160 and reads its sample packet C, both reads from and writes to its sample packet E, and writes to its sample packet F, thereby updating the sample vector. Sequential operations read from or write to various sample packets. For example, shader 152's second process 157 will read/write packet B and only read packet E. Next, shader 152's third process 159 will write to packet B, read packet F and read/write packet G. Thus, output vector 154 will have its packets B, E, F and G changed from its input sample vector 160. Note: in output vector 154, sample packets A, D, F and H remain unchanged from input sample vector 160; however, packets B, C, E and G are changed and are now labeled as packets $B^1$, $C^1$, $E^1$ and $G^1$.

As can be appreciated, an advantage of the present invention is that shader 152 does not need to operate on every sample packet in the input sample vector. In the above example, sample packets A, C, D and H are not operated on, and thus remain unchanged. It should also be noted that although packet F is changed, its initial value is never read and so it does not need to be initialized. This important feature of the invention permits shading operations to be "sliced" as shown in FIG. 3, as follows.

FIG. 3 corresponds to FIG. 2, but FIG. 3 shows three examples of shader "slicing" IE: different shading operations being carried out on different sample packets of a sample vector, as follows. Thus, in the first example in FIG. 3, shader slice 176 is the result of selecting output packets B and G. Shader slice 176 comprises only process 159, outputting packets $B^1$ and $G^1$ in output vector 178 (from input packets B and G in input sample vector 162). In the next example in FIG. 3, shader slice 164 is the result of selecting output packet E. The slice only comprises process 156, outputting packet $E^1$ in output vector 166 (from input packets C and E in input sample vector 168). In the last example in FIG. 3, shader slice 170 is the result of selecting output packets F and G. As such it comprises processes 156 and 159, outputting packets $F^1$ and $G^1$ in output vector 172 (from input packets B and G in input sample vector 174).

As such, the present invention provides a method of slicing a shader 152 by: selecting a master shader 152 which operates on sample vectors; selecting a desired set of output packets; creating a sliced shader from the master shader to compute only the desired set of output packets. Optionally, the above method can then be repeated on the sliced shaders or sub-shaders. Slicing also reduces the number of packets required in the sample vector, and may not require all of those to be initialized, so another optional step is reading from the sliced shader a required set of input packets to compute the desired set of output packets. As can be appreciated, the sliced shader may be created from the minimal sequential actions required to compute the desired set of output packets.

In optional embodiments, a master shader may comprise a shader network or DAG, with the sliced shader being created by instancing the DAG with restricted outputs.

As can be seen from the above examples, the present shading system can be used to implement shaders or shader slices with various inputs and outputs. These various inputs and outputs may influence both displacement and coloring. For example, displacement of terrain may be based on a height map and the color of the terrain may be based on a color gradient. The animation being created may involve a scene with mountains where the tops of the mountains appear white to represent snow. In this example, both the color and the displacement are based on the same underlying texture map. In pre-existing systems, different shaders had to be used for each of the coloring and the displacement. Thus, the animator had to separately coordinate the displacement and coloring.

This problem is avoided in the present invention since displacement and coloring can be handled together by "slicing" the shading as described above. Specifically, a single shader outputs packets for both displacement and final color. This is particularly advantageous if the render program could evaluate both displacement and final color at the same time in one pass. Alternately, should the rendering program require two passes, it could slice the shader by asking for only those outputs it needs during each pass. For example, the shader could compute those outputs, and request the inputs that it needs when it needs them. The rendering program could provide those inputs and the shader could generate either the displacement or the coloring output at the appropriate phase of the rendering operation. This slicing of shaders allows them to be used with rendering systems with very different requirements.

When slicing shaders that consist of layers, computing the required inputs can be accomplished by comparing the desired output to the final layer in the shader. If the final layer does not output any of those packets, the system can ignore that layer and instead move to the prior layer. On the other hand, if the layer does output one of those packets, the system can then consider the inputs and outputs and modify the requirements before moving to the prior layer. For example, if a layer outputs packet A but does not read it, then the prior layer does not need to output packet A, and packet A can thus be removed from the output vector. However, if this layer instead reads packet B, then even if the final output vector does not need packet B, the prior layer will need to output it, and packet B can be added to the output vector type. This process can be repeated such that the right sequence of layers for the slice and the initial input for the slice will be known.

In optional aspects of the invention, it is possible to cache values from one stage process to use in another process. For example, in the above scene with mountains where the tops of the mountains appear white to represent snow, a displacement slice of the shader could output both a displacement position vector and a displacement height. The coloring slice of the shader could then take the displacement height as an input which would be computed from the displacement shader. Since they are calculated in separate stages of rendering, the displacement height could be stored at each vertex in a displacement mesh and interpolated during shading. This would result in far better system performance, based on how hard it is to compute the displacement and how hard it is to compute the color at each displaced point. In addition, this could be done again based on slicing and vector types. For example, the displacement shader could be evaluated for the displacement vector, outputting a displacement packet D. The shader could then be sliced again to compute the final color. Two different slices could be processed. First, a slice to compute color based just on packet D with post-displacement geometric parameters also being used. If this required pre-displacement parameters, the system would instead be sliced such that it did not take packet D as an input. If not, the color shader can use D together with parameters that are normally stored on the surface.

Another advantage of the present invention is that the packets can be indexed as objects and by type. Therefore, a packet of type A for an object 1 would be different from a packet of type A for another object 2. In addition, if the shader wants to know the property B for every sample, all that is required is to ask for the packet for property B and this information can be propagated to the geometry which can then generate the requested sample packet. It is understood that many different types of packet indexing systems are possible in accordance with the present invention.

In further optional embodiments, the sequential actions can be converted to a DAG by: converting each sequential action into a computation node; creating data nodes for each input and output packet; and then linking computational nodes to their input nodes from a previous stage and to their output nodes in a next stage. Optionally as well, sequential actions can be converted to separate DAGs for each render thread.

The DAG thus created could be more efficient to process since sequential actions would not need to perform packet lookups on their input sample vector. Instead those packet references can be stored as pointers as follows. The system can start with the known vector type of input packets for the layers, computed as described herein. The packets for the vector type can be converted to data nodes which simply store values for a single packet. Starting from the bottom layer, the system can convert the layer to a processing node, and it can link that node to its input packets by pointers to the data nodes. The system can then update the vector type for the next layer and continue in the same manner, except that the system can also link processing layers to their output nodes. Thus created, the DAG can also be evaluated using normal depth-first traversal and invalidation.

What is claimed is:

1. A method of shader slicing, comprising the steps of:
   selecting a master shader which operates on sample vectors, wherein the sample vectors each comprise a plurality of packets, wherein each packet represents a shading property;
   selecting a desired set of output packets;
   creating a sliced shader from the master shader to compute only the desired set of output packets; and
   performing the following method on the sliced shader:
      storing shading information in a sample vector comprising a plurality of packets, wherein each packet represents a shading property;
      performing a series of sequential actions on the sample vector, wherein each of the sequential actions operates on at least one, but less than all of the plurality of packets in the sample vector, such that the sample vector is updated by each sequential action, the series of sequential actions consisting of:
         first, performing a base material calculation,
         second, performing a general shader calculation,
         third, performing an effect calculation, and
         fourth, performing a lighting computation; and then,
      reading out shading results from modified or unmodified packets in a final sample vector.

2. The method of claim 1, wherein the master shader is composed of sequential actions; and wherein the sliced shader is created from the minimal sequential actions required to compute the desired set of output packets.

3. The method of claim 1, wherein the master shader is composed of a shader directed acyclic graph (DAG); and wherein the sliced shader is created by instancing the DAG with restricted outputs.

4. The method of claim 1, wherein the sequential actions index the packets by object.

5. The method of claim 1, wherein the sequential actions index the packets by type.

6. The method of claim 1, wherein the sequential actions are converted to a DAG by:
   converting each sequential action into a computation node;
   creating data nodes for each input and output packet; and
   linking computational nodes to their input nodes from a previous stage and to their output nodes in a next stage.

7. The method of claim 6, further comprising:
   converting sequential actions to separate DAGs for each render thread.

8. The method of claim 1, wherein output packets from the sliced shader are cached and reused as inputs to a different sliced shader.

9. The method of claim 1, further comprising:
   reading a required set of input packets to compute the desired set of output packets.

10. The method of claim 1, wherein at least one of the series of sequential actions reads values from sample vector packets using a read-only effect.

* * * * *